United States Patent [19]

Koltz et al.

[11] 4,084,739
[45] Apr. 18, 1978

[54] APPARATUS AND METHOD FOR ALIGNING AND WELDING TUBULAR METAL COMPONENTS TOGETHER

[75] Inventors: Lawrence D. Koltz, Colgate; Herbert E. Pritzlaff, Brookfield, both of Wis.

[73] Assignee: Wisconsin Centrifugal, Inc., Waukesha, Wis.

[21] Appl. No.: 772,913

[22] Filed: Feb. 28, 1977

[51] Int. Cl.² .................. B23K 13/02; B23P 19/00
[52] U.S. Cl. ............................ 228/168; 228/44.5; 228/219; 269/48.1
[58] Field of Search ............ 228/44.5, 49, 168, 219; 269/48.1

[56] References Cited

U.S. PATENT DOCUMENTS

| | | | |
|---|---|---|---|
| 2,615,414 | 10/1952 | Adams | 269/48.1 X |
| 3,194,466 | 7/1965 | Davis | 228/44.5 X |
| 3,425,614 | 2/1969 | Clark | 228/49 |
| 3,633,813 | 12/1972 | Looney | 228/44 |
| 3,644,977 | 2/1972 | Valentine | 228/49 X |
| 3,684,149 | 8/1972 | Ambler | 228/49 |
| 3,770,927 | 11/1973 | Christopher | 228/44.5 X |
| 3,825,167 | 7/1974 | Komorek | 269/48.1 |
| 3,910,481 | 10/1975 | Urbanic | 228/49 |

Primary Examiner—Donald G. Kelly
Attorney, Agent, or Firm—Charles B. Cannon

[57] ABSTRACT

An apparatus and method for concentrically and radially aligning and welding together two tubular metal components, such as a metal pipe or tubing, and a tubular flanged member, or two or more metal pipes or tubings. The adjacent end wall portions of the two tubular metal components are positioned against each other in contiguous or abutting relationship; a segmented generally cylindrical or tubular mandrel or split sleeve unit, embodying component radial segments, and having an inflatable elastic tubular member or boot arranged therein, is inserted into the segmented tubular mandrel or split sleeve unit; the inflatable elastic tubular member or boot is then inflated to expand the component radial segments of the segmented tubular mandrel or split sleeve unit radially outwardly against the internal surfaces of the tubular metal components to position and hold them in properly mated or concentrically axially and radially aligned position and in contiguous or abutting relationship with and relative to each other; the contiguous or abutting end wall portions of the tubular metal components are then preliminarily or tack-welded together from outside the tubular metal components while a stream of argon, or other inert gas, is discharged radially outwardly into the weld area from within the segmented tubular mandrel into the weld area during the preliminary or tack-welding operation to insure an oxide-free preliminary or tack-weld joint; the inflated elastic tubular member or boot is then partially deflated, and the segmented tubular mandrel or split sleeve unit and the deflated elastic tubular member or boot are withdrawn from the thus preliminarily or tack-welded tubular metal components; and the welding operation is then completed by filling in the weld area with weld metal from outside the tubular metal components while a stream of argon or other inert gas is blown into the weld area from the welding head to assure an oxide-free completed weld joint.

22 Claims, 14 Drawing Figures

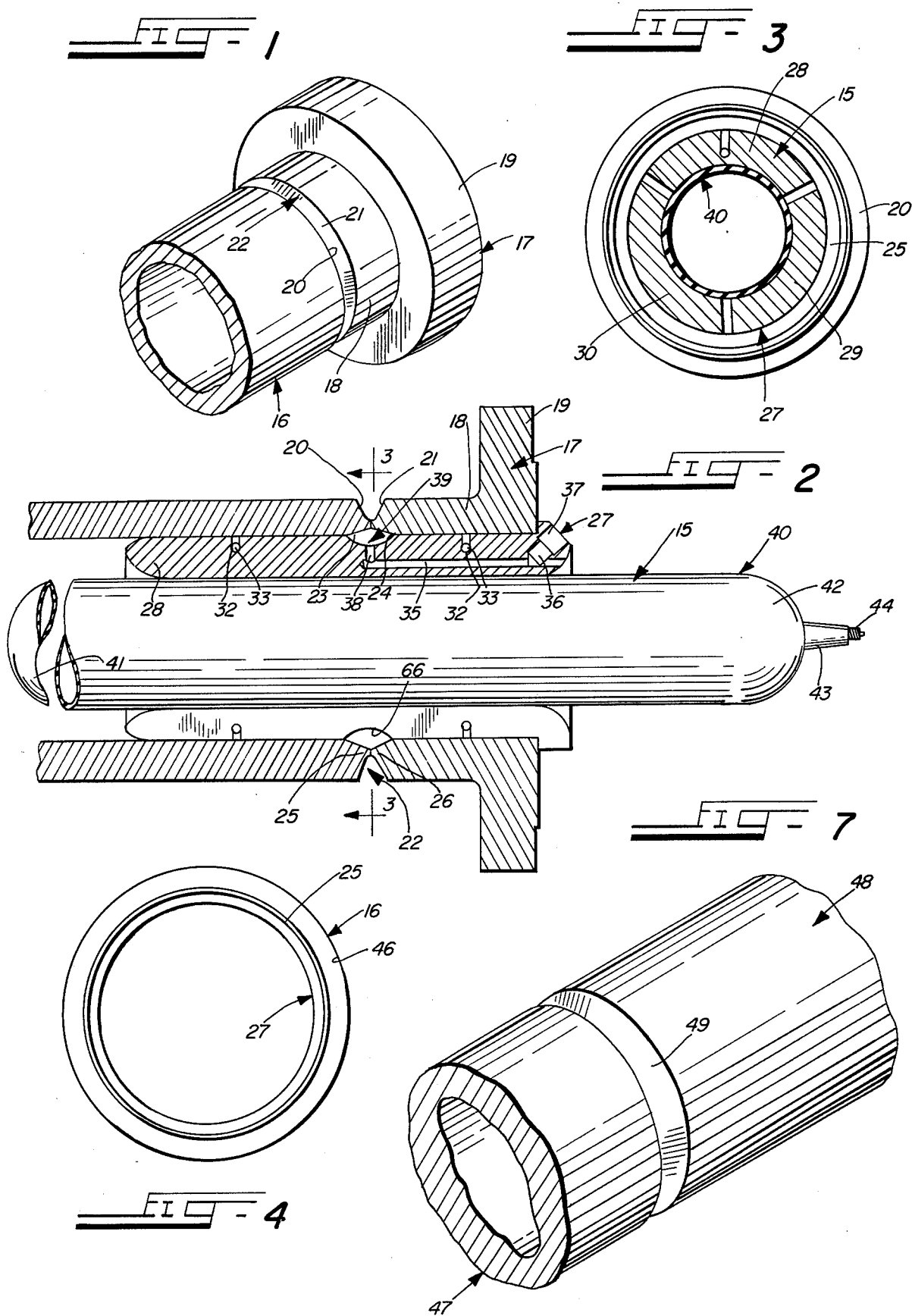

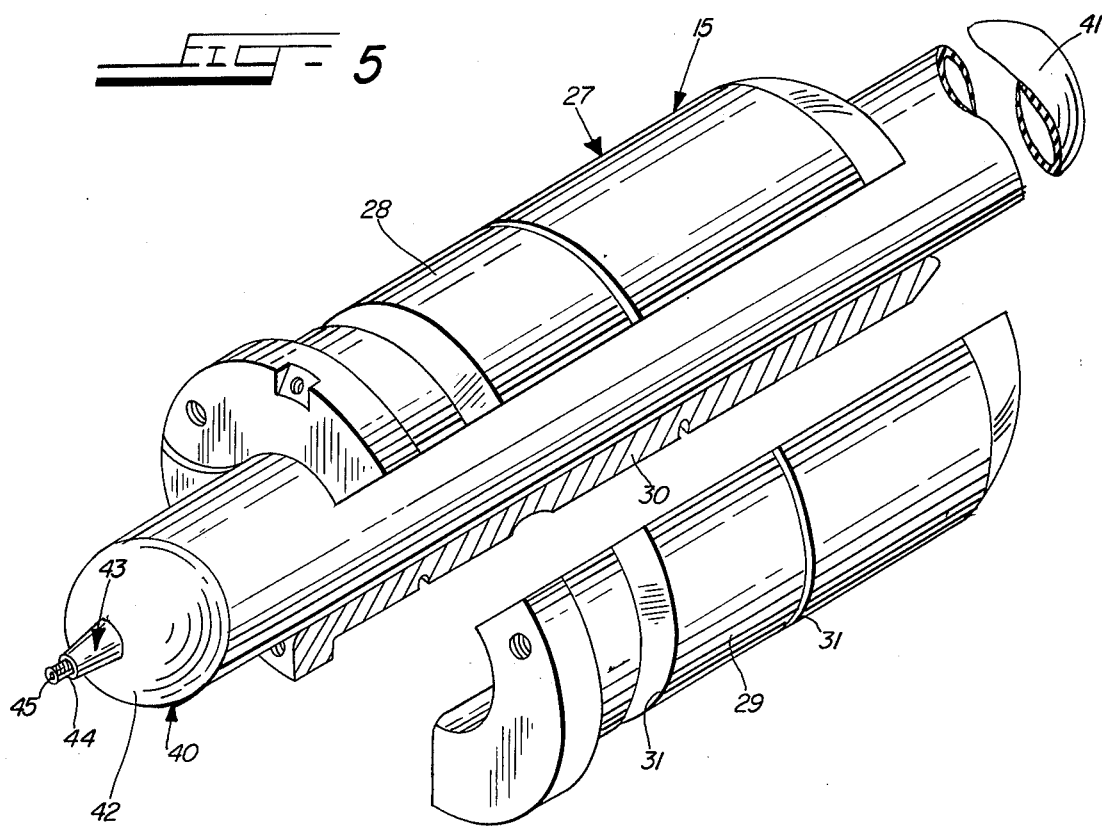
 
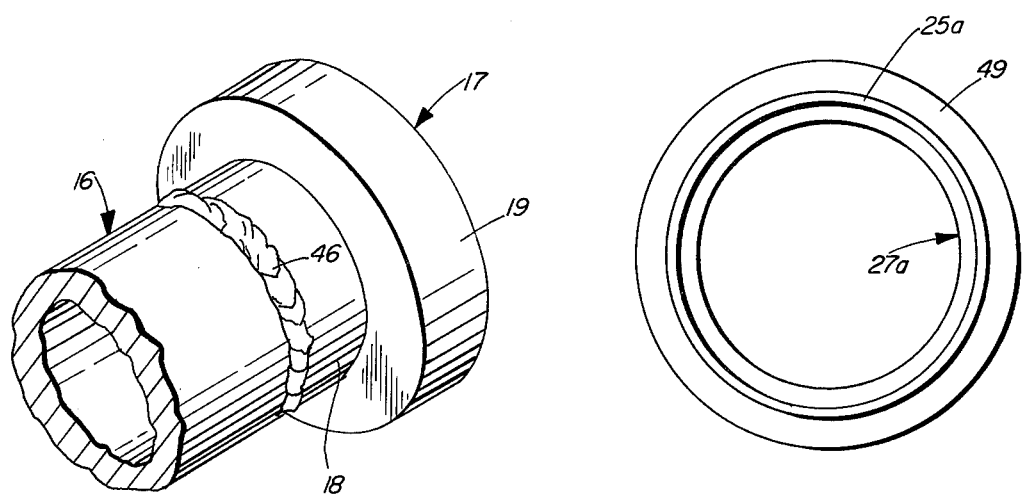

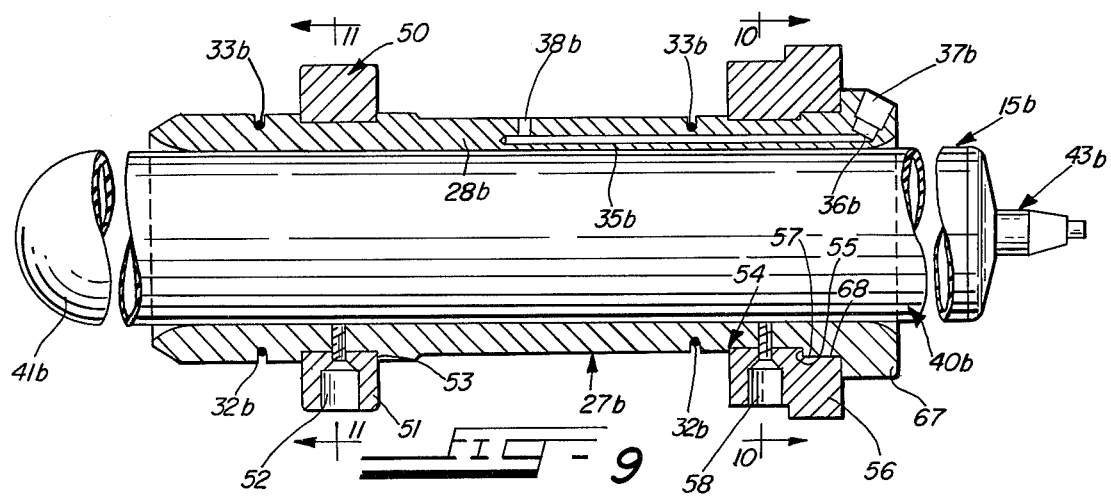
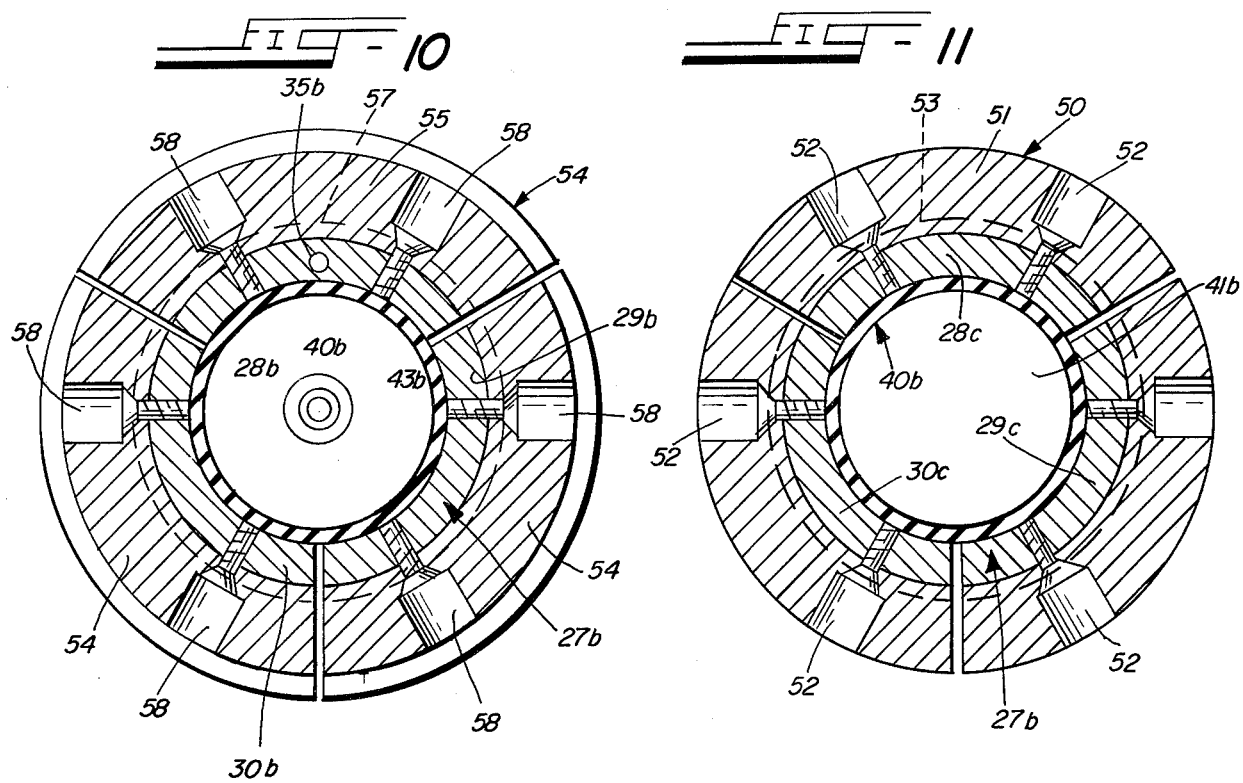

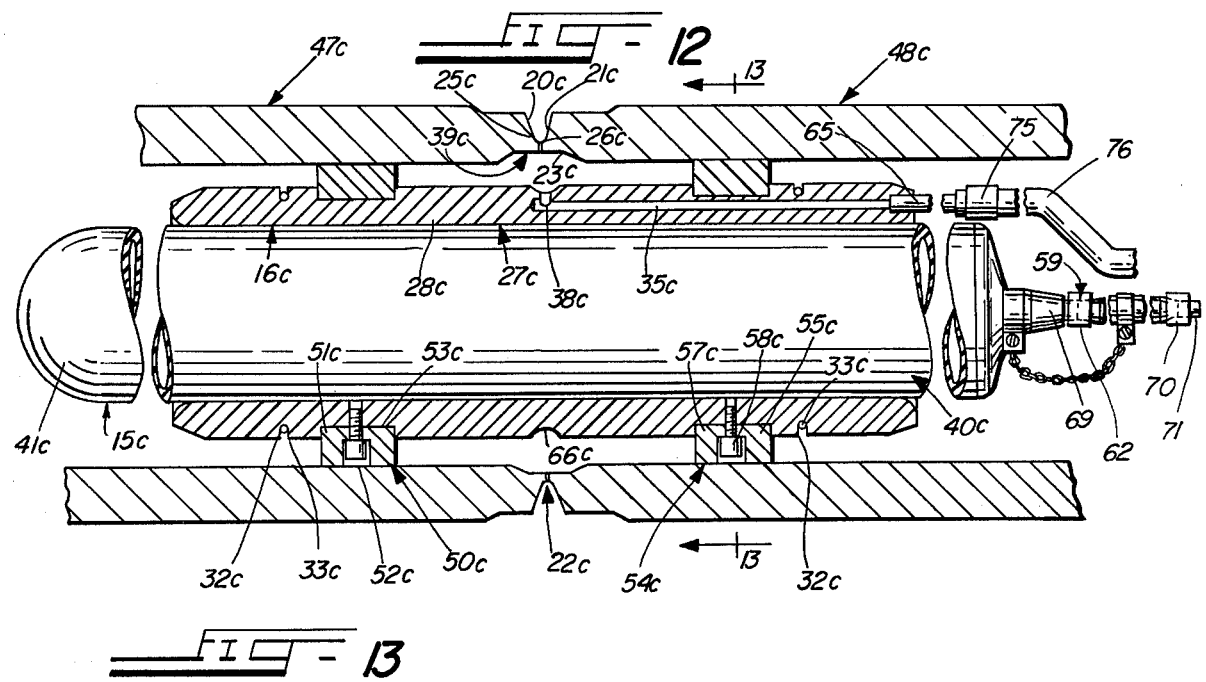
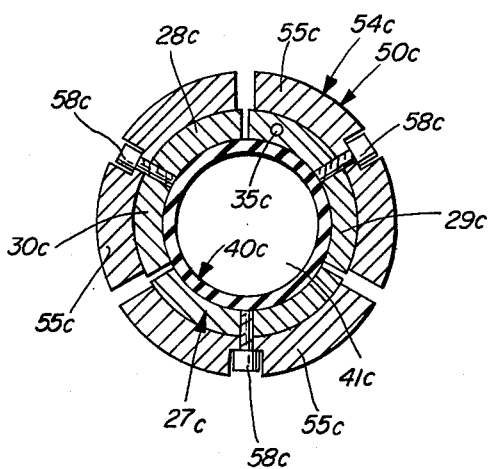
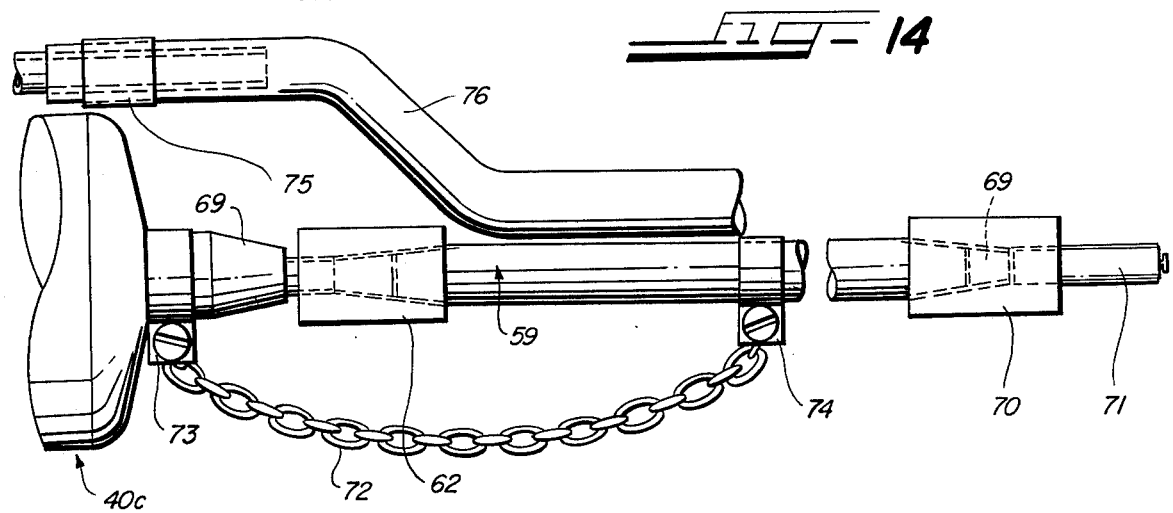

APPARATUS AND METHOD FOR ALIGNING AND WELDING TUBULAR METAL COMPONENTS TOGETHER

BACKGROUND OF THE INVENTION

Various devices and apparatus and methods have been known and used heretofore for concentrically and radially aligning and welding together tubular metal components, such as metal pipe or tubing and a tubular or annular metal flanged member, or two metal pipes or tubings. However, such prior apparatus and methods have been subject to a number of disadvantages and objectionable features among which are one or more of the following: (1) they have been slow in operation and the apparatus required has been complicated and expensive to manufacture and time-consuming and costly in use; or (2) they have required the use of complicated fixtures and the use of two workmen, namely, one workman to hold the fixture while a second workman does the preliminary or tack-welding of the two tubular metal components; or (3) they have required the use of a separate tubular member for blowing a stream of argon or other inert gas into the weld area from outside the tubular metal components during the preliminary or tack-welding operation to insure an oxide-free preliminary or tack-weld; or (4) they have not been able to assure complete and accurate concentric and radial alignment of the contiguous or abutting end wall portions of the tubular metal components prior to the preliminary or tack-welding operation and the main welding operation with the result that the weld joints thus made have frequently resulted in imperfect welds including cracks or fissures and other imperfections.

Moreover, it has been found that tubular metal components, such as metal pipes or tubings, or a metal pipe or tubing and a tubular or annular flanged member to be welded thereto, may vary significantly in diameter such as, for example, an eighth of an inch ($\frac{1}{8}''$), or more, from their specified diameters, and if two metal components having such variations in diameter, and which are to be welded together, are not properly concentrically and radially aligned before they are welded together the weld joint between them may be imperfect and have cracks or fissures or other imperfections therein.

OBJECTS OF THE INVENTION

An object of the invention is to provide a new and relatively simple apparatus and method for concentrically aligning and welding together tubular metal components, such as a metal pipe or tubing and a tubular or annular flanged member, or two or more metal pipes or tubings.

Another object of the invention is to provide a new and improved apparatus and method for concentrically and radially aligning and welding together two metal components and which apparatus and method in use overcome the difficulties and problems heretofore experienced in the prior art, including those hereinbefore pointed out.

Further objects of the invention are: (1) to provide a new and improved apparatus for concentrically and radially aligning and welding together two tubular metal components, such as a metal pipe or tubing and an annular flanged member, or two or more metal pipes or tubings, and in which the new apparatus is (a) relatively simple and inexpensive in construction and can be readily manipulated by a single workman or welder; (b) does not require the use of expensive or complicated fixtures; (c) does not require the need for or the use of a separate tubing for discharging a stream of argon, or other inert gas, into the weld area from outside the tubular metal components, during the preliminary or tack-welding operation, to insure an oxide-free preliminary or tack-weld; and (d) which assures proper concentric and radial alignment of the two tubular metal components prior to the preliminary or tack-welding operation even though the two tubular metal components may vary as much as an eighth of an inch ($\frac{1}{8}''$) or more, in diameter, from their specified diameters, thus insuring that the preliminary or tack weld and the completed weld joint between the two tubular metal components will be satisfactorily uniform and free from cracks or fissures or other imperfections which may result in cases in which the tubular metal components have significant variations in diameter from their specified diameters.

An additional object of the invention is to provide, in one form thereof, novel means for adapting the new apparatus for use in welding together metal pipes or tubings and annular flanged members of varying diameters.

A further object of the invention is to provide in another form thereof novel means for adapting the new apparatus for use in welding together two or more relatively long metal pipes or tubings, including a novel combination rigid air pipe or tubing and rigid handle means for inserting the new apparatus into and withdrawing it from such relatively long metal pipes or tubings, and novel auxiliary means for withdrawing the new apparatus from such relatively long metal pipes or tubings in the event of failure of the rigid handle means when the new apparatus is disposed within such relatively long metal pipes or tubings.

Another object of the invention is to provide a novel generally cylindrical or tubular segmented mandrel or split sleeve unit for concentrically and radially aligning the two tubular metal components prior to the time they are preliminarily or tack-welded together.

Still another object of the invention is to provide in the new generally cylindrical or tubular segmented mandrel or split sleeve unit novel means for blowing an inert gas, such as argon, into the weld area between the contiguous or abutting end walls of the two tubular metal components from inside the two tubular metal components prior to and during the preliminary or tack-welding operation to drive out any air which may be in the weld area prior to or during the preliminary or tack-welding operation and thus assure an oxide-free preliminary or tack-weld.

Other objects will appear hereinafter.

DESCRIPTION OF FIGURES IN THE DRAWINGS

FIG. 1 is a perspective view, partly in section, of two tubular metal components, namely, a metal pipe or tubing and an annular flanged member, which are to be welded together, having inner end portions arranged in contiguous and abutting relationship but prior to the insertion therein of the new segmented generally cylindrical mandrel or split sleeve member and the inflatable elastic tubular member or boot;

FIG. 2 is a central longitudinal sectional view of the two tubular metal components shown in FIG. 1, having their inner end portions arranged in contiguous and abutting relationship, with the new generally cylindrical segmented tubular mandrel or split sleeve member and the inflatable elastic tubular member or boot inserted therein and ready for use in the welding operation;

FIG. 3 is a transverse sectional view on line 3—3 in FIG. 2;

FIG. 4 is a transverse sectional view through the completed weld joint between the metal pipe or tubing and the annular flanged member shown in FIGS. 1, 2 and 3;

FIG. 5 is an exploded perspective view, partly in section, illustrating the new segmented tubular mandrel unit and inflatable elastic member or boot shown in FIG. 2;

FIG. 6 is a perspective view, partly in section, of the metal pipe or tubing and the annular flanged member, shown in FIGS. 1 and 2, welded together;

FIG. 7 is a perspective view, partly in section, of two metal pipes or tubings welded together in the practice of the present invention;

FIG. 8 is a transverse sectional view showing the completed weld joint between the two metal tubes or pipes shown in FIG. 7, and the segmented tubular mandrel or split sleeve unit arranged therein;

FIG. 9 is a central longitudinal sectional view of a modification of the invention which includes a pair of adapter units which are used in connection with the practice of the invention, as illustrated in FIGS. 1 to 6, inclusive, to adapt the new segmented tubular mandrel unit and the inflatable tubular member or boot for use with metal pipes or tubes and annular flanged members of varying diameters;

FIG. 10 is a transverse sectional view, on line 10—10 in FIG. 9, illustrating one of the adapter units which are used in and in conjunction with the form of the invention illustrated in FIG. 9;

FIG. 11 is a transverse sectional view, on line 11—11 in FIG. 9, illustrating another one of the adapter units which are used in conjunction with the form of the invention illustrated in FIG. 9;

FIG. 12 is a central longitudinal sectional view illustrating another modification of the invention which is used to adapt the new segmented tubular mandrel or split sleeve unit and the inflatable tubular member or boot for use in welding together two or more relatively long metal pipes or tubings;

FIG. 13 is a transverse vertical sectional view, on line 13—13 in FIG. 12, illustrating one of the adapter units which are embodied in the modification of the invention illustrated in FIG. 12; and FIG. 14 is a fragmentary detail view illustrating certain of the parts embodied in the form of the invention illustrated in FIGS. 12 and 13 of the drawings.

DESCRIPTION OF THE FORM OF THE INVENTION ILLUSTRATED IN FIGS. 1 TO 6, INCLUSIVE, OF THE DRAWINGS

A typical and preferred embodiment and use of the invention are illustrated in FIGS. 1 to 6, inclusive, of the drawings, wherein the new apparatus is generally indicated at 15 and is shown as being used to concentrically and radially align together for welding two tubular ferrous or like metal components, namely, a metal pipe or tubing 16 and an annular flanged member 17 which includes a main tubular body 18 having an annular flange 19 therein at its outer end. As shown in FIGS. 1 and 2, the inner end wall of the metal pipe or tubing 16 is provided on its external peripheral surface with an annular groove or recess 20 and the inner end wall of the body 18 of the annular flanged member 17 is provided on its external peripheral surface with a corresponding and complementary annular groove or recess 21. The two annular grooves or recesses 20 and 21 cooperate, in the assembled position of the two tubular components 16 and 17, to provide an annular weld area 22 between the contiguous and abutting inner end wall of the metal pipe or tubing 16 and the inner end wall of the body 18 of the annular flanged member 17 on the outer or external peripheral surface of the two tubular metal components 16 and 17 (FIG. 2).

As is shown in FIG. 2, the internal peripheral surface of the inner end wall of the metal pipe or tubing 16 is provided with an annular groove or recess 23 and the inner end wall of the body 18 of the annular flanged member 17 is provided on its internal peripheral surface with a corresponding and complementary annular groove or recess 24. The two annular grooves or recesses 23 and 24 cooperate with the two annular grooves 18 and 19, in the assembled position of the parts, as in FIG. 2, to form a pair of annular contiguous inner end wall portions 25 and 26 of reduced thickness or diameter on the metal pipe or tubing 16 and on the body 18 of the annular flanged member 17, respectively. The two annular grooves or recesses 23 and 24 likewise cooperate to form an annular internal groove 39 on the inner peripheral surfaces of the inner end walls of the two tubular components 16 and 17 (FIG. 2).

In the practice of the present invention the metal pipe or tubing 16 and the annular flanged member 17 are positioned to bring the two annular inner end wall portions 25 and 26 of reduced thickness or diameter together into contiguous and abutting relationship, as shown in FIG. 2.

The new apparatus 15 includes a generally cylindrical segmented tubular mandrel or split sleeve unit, which is generally indicated at 27 in the drawings, and includes three component radial metallic segmented members 28, 29 and 30 each of which is provided on its external peripheral surface with a plurality of longitudinally or axially spaced segmental arcuate grooves 31 (FIG. 5) and when the component radial segmental members 28, 29 and 30 are in assembled position, as in FIG. 2 of the drawings, the segmental arcuate grooves 31 in the component radial segmental members 28, 29 and 30 coact to form a plurality of annular longitudinally or axially spaced grooves 32 on the segmented metallic tubular mandrel or split sleeve unit 27.

The component radial segmental members 27, 28 and 29 are held in assembled position by resilient retaining means in the form of garter springs or rings 33 which fit into the annular grooves 32 to hold the assembled component radial segmental members 27, 28 and 29 of the segmented tubular mandrel or split sleeve unit 27 in assembled but expansible position and thus enable it to be inserted into the interior of the tubular metal components 16 and 17 while permitting the component radial segmental members 28, 29 and 30 of the segmented tubular mandrel or split sleeve unit 27 to be expanded radially outwardly against the action of the resilient retaining means or garter springs 33, as will be described hereinafter.

As shown in FIG. 2 of the drawings, the radial segmental member 28 of the segmented tubular mandrel or split sleeve unit 27 has an axially extending gas-conducting passage 35 formed therein and this gas-conducting passage 35 opens, by way of an inclined inlet passage 36 and an external inlet opening 37, onto the outer surface of the component radial segment 28. The gas-conducting passage 35 opens at its inner end, by way of a radially extending outlet 38, into an annular groove 66 which is formed on the external peripheral surface of the segmented tubular mandrel or split sleeve unit 27, and the annular groove 66, in the assembled position of the parts, as in FIG. 2, opens into the internal annular groove 39 which is formed on the internal peripheral surfaces of the tubular metal components 16 and 17.

It will be noted (FIG. 3) that each of the three component radial segmental members 28, 29 and 30 has a segmental circumferential area of approximately 120° of the circumferential area of the assembled segmented tubular mandrel or split sleeve unit 27.

The new apparatus 15 includes an elongated tubular expandable elastic member or boot 40, which may be made of suitable inflatable elastic material such, for example, as natural rubber or synthetic polymer material, and has a closed inner end wall 41, and at its outer end wall 42 is provided with a gas valve unit 43 which includes an externally threaded valve stem 44 which is adapted to be attached to a tank or other source of air under pressure; the valve stem 44 being provided with a removable closure cap 45 (FIG. 5).

OPERATION AND USE OF THE FORM OF THE INVENTION ILLUSTRATED IN FIGS. 1 TO 6, INCLUSIVE, OF THE DRAWINGS

In the use of the form of the invention illustrated in FIGS. 1 to 6, inclusive, of the drawings, the annular grooves 20-23 and 21-24 are formed in the two tubular metal components 16 and 17, respectively, prior to the time the tubular metal components 16 and 17 are assembled, thereby forming the annular end wall portions 25 and 26 of reduced thickness or diameter, whereupon the tubular metal components 16 and 17 are assembled, as shown in FIG. 2, with the reduced diameter annular inner end wall portions 25 and 26 in contiguous and abutting relationship and with the annular external grooves 20 and 21, respectively, therein in mating relationship to provide the annular groove and weld area 22.

The segmented tubular mandrel or split sleeve unit 27 is then assembled with the component radial segmental members 28, 29 and 30 thereof held in mating relationship by the resilient metallic retaining members or garter springs 33 which are arranged in the annular grooves 32. The expandable elastic tubular member or boot 40 is then inserted into the assembled segmented tubular mandrel or split sleeve unit 27 and partially inflated to enable it to grip or grab the inner peripheral surface of the radial segmental members 27, 28 and 29 and thus enable the segmental tubular or split sleeve unit 27 and the inflatable member or rubber boot 40 to be inserted, as a unit, into the tubular metal components 16 and 17. The assembly of the segmented tubular mandrel or split sleeve unit 27 and the expandable elastic tubular member or boot 40 is then inserted into the internal bore or cavity in the assembled tubular metal components 16 and 17 a distance such that the radially extending gas outlet 38 from the gas-conducting passage 35 in the radial segmental member 28 comes into approximate radial alignment with the annular internal groove 39 and radially inwardly of the contiguous and abutting inner end walls 25 and 26 of the tubular metal components 16 and 17, respectively, as shown in FIG. 2.

The valve stem 44 of the expandable elastic tubular member or boot 40 is then connected to a suitable source of air under pressure to inflate and expand the expandable tubular elastic member or boot 40 and thereby expand the component radial segmental members 28, 29 and 30 of the segmented tubular mandrel or split sleeve unit 27 radially outwardly against the internal wall surfaces of the assembled tubular metal components 16 and 17 against the action of the resilient retaining means or garter springs 33. This operation brings the tubular metal components 16 and 17 and their contiguous and abutting inner end wall portions 25 and 26 into exact mating relationship and into exact concentric and radial alignment and thus assures proper concentric and radial alignment of the tubular metal components 16 and 17 and of their inner end walls 25 and 26 prior to the preliminary or tack-welding operation while, at the same time, accommodating the tubular metal components 16 and 17 and their inner end walls 25 and 26 to any variations in the specified diameters thereof, such as a variation of an eighth of an inch ($\frac{1}{8}$") or more, which the tubular metal components 16 and 17 may have from their specified diameters.

The gas inlet 36–37 to the gas-conducting passage 35 in the tubular metal segment 28 of the segmented tubular mandrel or split sleeve unit 27 is then connected to a source of argon, or other inert gas, under pressure, so as to conduct the argon or other inert gas through the gas-conducting passage 35 and the radially extending outlet 38 thereof into the annular grooves 39 and 66 and thence through the annular contacting area between the contiguous and abutting inner end wall portions 25 and 26 of the tubular metal components 16 and 17 into the annular groove or weld area 22 so as to flood the annular groove or weld area 22 with argon, or other inert gas, and expel the air therefrom prior to and during the preliminary or tack-welding operation, or so-called root pass, and thus prevent the formation of objectionable oxides in the preliminary or tack-weld joint which is formed by the fusion of the parent metals and/or the application of weld metal at the radially inner end of the annular groove which provides the weld area 22. In this manner, the contiguous and abutting inner end wall portions 25 and 26 of the two tubular metal components 16 and 17 are preliminarily or tack-welded together by an annular weld or root pass in the annular groove and weld area 22, thus holding the two tubular metal components together in properly aligned relationship prior to the main welding operation.

The expandable elastic tubular member or boot 40 is then partially deflated, by opening the valve unit 43, whereupon the assembly of the segmented tubular mandrel or split sleeve unit 27 and the inflatable expandable elastic tubular member or boot 40 are withdrawn from the thus preliminarily or tack-welded tubular metal components 16 and 17.

The welder then completes the welding operation by filling the annular groove and weld area 22 with weld metal, from outside the tubular metal components 16 and 17, to form the completed weld joint 46 (FIGS. 4 and 6), thereby completing the operation of welding the two tubular metal components 16 and 17 together.

During the main welding operation a stream of argon or other inert gas is discharged from the weld head and outside the tubular metal components 16 and 17, into the annular groove and weld area 22, so as to assure the formation of an oxide-free completed weld joint between the two tubular metal components 16 and 17.

It will be noted that while the inner end wall portions 25 and 26 of the tubular metal components 16 and 17 are shown as being in abutting relationship they may be spaced slightly in contiguous although not abutting relationship, if it is desired to provide a somewhat larger passage for the argon, or other inert gas, into the annular groove and weld area 22, than is provided by the space or crack between the abutting inner end wall portions 25 and 26 of the tubular metal components 16 and 17 which is normally adequate to permit a stream of argon or other inert gas to flow therethrough into the annular groove or weld area 22.

THE USE OF THE INVENTION AS ILLUSTRATED IN FIGS. 7 AND 8 OF THE DRAWINGS

Another typical use of the invention is illustrated in FIGS. 7 and 8 of the drawings, wherein the invention is shown as used to concentrically and radially align and preliminarily or tack-weld together two tubular metal components 47 and 48 which are in the form of two metal pipes or tubings, rather than a metal pipe or tubing 16 and an annular flanged member 17, as in the use of the invention illustrated in FIGS. 1 and 6, inclusive, and to form a weld joint 49 therebetween.

The use of the invention, as illustrated in FIGS. 7 and 8 of the drawings, is otherwise similar to the use of the invention as illustrated in FIGS. 1 to 6, inclusive, and hence those parts in the use of the invention, as illustrated in FIGS. 7 and 8, which are similar to or correspond to parts in the use of the invention as illustrated in FIGS. 1 to 6, inclusive, of the drawings, have been given similar reference numerals followed by the additional and distinguishing reference character "a".

THE MODIFICATION OF THE INVENTION ILLUSTRATED IN FIGS. 9, 10 AND 11 OF THE DRAWINGS

A modification of the invention is illustrated in FIGS. 9, 10 and 11 of the drawings, and those parts thereof which are similar to or correspond to parts in the form of the invention illustrated in FIGS. 1 to 6, inclusive, have been given the same reference numerals followed by the additional and distinguishing reference character "b".

The modification of the invention illustrated in FIGS. 9, 10 and 11 of the drawings is designed to enable the new apparatus 15b to be used in welding together tubular metal pipes or tubing and annular flanges of varying diameters.

Thus, the form of the invention illustrated in FIGS. 9, 10 and 11 includes a first segmental annular adapter unit 50 which is arranged, at the (in use) axially inner end portion of the segmented tubular mandrel or split sleeve unit 27b, and is shown as being composed of three arcuate adapter members 51 each of which has a circumferential area of approximately 120° of arc. Each of the arcuate adapter members 51 is attached by fastening elements, in the form of cap screws 52, to a corresponding one of the segmental components 28b-29b-30b of the segmented tubular mandrel or split sleeve unit 27b, and the three arc-shaped adapter members 51 are retained in assembled position of use by resilient retaining means in the form of garter springs 32b which are arranged in coacting segmental grooves 33b which are formed in the external peripheral surfaces of the segmental components 28b-29b-30b of the segmental tubular mandrel or split sleeve unit 27b.

The radial thickness of the arcuate adapter members 51 may be varied, as desired, to adapt the segmented tubular mandrel or split sleeve unit 27b to the internal diameter of the tubular metal component 16b to which the segmented tubular mandrel or split sleeve unit 27b and the tubular inflatable member or rubber boot 40b are to be adapted in use.

The modification of the invention illustrated in FIGS. 9, 10 and 11 also includes a second adapter unit 54 which is arranged at the (in use) axially outer end portion of the segmented tubular mandrel or split sleeve unit 27b and includes three arcuate adapter members 55, each of which has a circumferential area of approximately 120° of arc. Each of the arcuate adapter members 55 has an arcuate flange 56 formed integral thereon on the axially outer end thereof, and the body of each of the arcuate adapter members 55 is mounted in an arcuate segmental groove 57 one of which is formed in each of the tubular mandrel segments 28b-29B-30b wherein each of the arcuate adapter members 55 is attached, by fastening elements in the form of cap screws 58, to one of the tubular mandrel segments 28b-29b-30b of the segmented tubular mandrel or split sleeve unit 27b.

As shown in FIG. 9, the axially outer end portion of each of the tubular mandrel segments 28b-29b-30b has a radially extending arcuate flange 67 formed on its outer peripheral surface and an arcuate groove 68 is formed in each of the arcuate flanges 67 and each of the arcuate flanges 56 fits into a corresponding one of the arcuate grooves 68.

Thus, the adapter unit 50 adapts, in use, the axially inner end portion of the segmented tubular mandrel or split sleeve unit 27b for use with and in metal pipes or tubings of varying diameters and the flanged adapter unit 54 adapts the axially outer end portion of the segmented tubular mandrel or split sleeve unit 27b for use with and in annular flanged members of varying diameters. Thus the new segmented tubular mandrel or split sleeve unit 27b may be adapted for use in concentrically and radially aligning and welding together metal pipes or tubings and annular flanged members of varying diameters.

THE MODIFICATION OF THE INVENTION ILLUSTRATED IN FIGS. 12, 13 AND 14 OF THE DRAWINGS

Another modification of the invention is illustrated in FIGS. 12, 13 and 14 of the drawings, and those parts thereof which are similar to or correspond to parts in the form of the invention illustrated in FIGS. 1 to 6, inclusive, or to corresponding parts in the form of the invention illustrated in FIGS. 9, 10 and 11 of the drawings, have been given similar reference numerals followed by the additional and distinguishing reference character "c".

The form of the invention illustrated on FIGS. 12, 13 and 14 of the drawings is designed to adapt the new apparatus 15c for use in concentrically and radially aligning and welding together two or more relatively long metal pipes or tubings 47c–48c at least one of which may have a length, for example, of 15 feet or more, and for use with metal pipes or tubings 47c–48c of varying diameters. Thus the form of the invention illustrated in FIGS. 12, 13 and 14 of the drawings embodies a pair or adapter units 50c and 54c on the segmented tubular mandrel or split sleeve unit 27c, as described hereinbefore in reference to the adapter units 50 and 54 which are embodied in the form of the invention illustrated in FIGS. 9, 10 and 11 of the drawings.

The form of the invention illustrated in FIGS. 12, 13 and 14 of the drawings embodies handle means for enabling the new segmented tubular mandrel or split sleeve unit 27c, and the inflatable elastic tubular member or boot 40c, to be inserted into and used with one or more relatively long metal pipes or tubings 47c–48c. To this end the internal parts of the valve unit, as 43 or 43b, on the outer end of the inflatable tubular elastic as employed in the forms of the invention illustrated in FIGS. 1 to 6, inclusive, in FIGS. 9, 10 and 11 of the drawings, are eliminated, and the former valve stem 69 is coupled by a coupling 62 to a first tubular means in the form of a rigid metal combination air pipe or tubing and handle member, generally indicated at 59, of the desired size or diameter and necessary length. The outer end portion 62 of the combination metal pipe or tubing and handle member 59 is connected, by a coupling 70 to an air valve 71 which may be connected to a source of air under pressure for inflating the tubular expandable elastic member or boot 40c.

A flexible member in the form of a metal chain 72 has one end portion attached, as at 73, to the stem portion 69 of the combination air pipe or tubing and handle member 59, and has its other end portion attached, as at 74, to the combination air pipe or tubing and handle member 59.

Likewise, to enable the form of the invention illustrated in FIGS. 12, 13 and 14 of the drawings, to be used with relatively long metal pipes or tubings 47c–48c, the gas-conducting passage 35c, which is formed in the tubular segments 29c, has an inlet 65 which is connected, by a coupling 75, to a second tubular means in the form of a flexible gas-conducting hose 76 which may be connected to a source or argon, or other inert gas, under pressure.

In the use of the form of the invention illustrated in FIGS. 12, 13 and 14 of the drawings, the tubular expandable member or boot 40c may be assembled inside the assembled segmented tubular mandrel or split sleeve unit 27c and partially inflated so that it will grip or grab the internal surface of the segmented tubular mandrel or split sleeve unit 27c and thus enable the segmented tubular mandrel or split sleeve unit 27c and the tubular expandable member or boot 40c to be inserted, by means of the said first tubular means in the form of the combination rigid air pipe or handle 59, to the desired point into the interior of one or more relatively long metal pipes or tubings, as 47c–48c, which is to be welded to another metal pipe or tubing.

The tubular expandable elastic member or boot 40c may then be inflated by air under pressure, supplied through the air valve 71 and the first tubular means in the form of the combination rigid air pipe or tubing and handle 59 and the (former) valve stem 69, to expand the radial segments 28c–29c–30c of the segmented tubular mandrel or split sleeve unit 27c radially outwardly against the inner peripheral wall surfaces of the metal pipes or tubings 47c–48c and thus concentrically and radially align the inner end wall portions 25c and 26c of the metal pipes or tubings 47c–48c prior to the start of the preliminary or tack-welding operation or so-called root pass. Argon, or other inert gas, under pressure, may then be supplied through the second tubular means in the form of the flexible gas-conducting hose 76, the coupling 75, and the inlet 65 through the gas-conducting passage 35c, and its radially extending outlet 38c, into the annular grooves 39c and 66c and thence between the abutting inner end wall portions 25c–26c of the metal pipes or tubings 47c–48c into the annular groove or weld area 22c, for the purposes hereinbefore described, whereupon the preliminary or tack-welding operation may proceed as hereinbefore described in connection with the form of the invention illustrated in FIGS. 1 to 6, inclusive, of the drawings.

The tubular expandable elastic member or boot 40c may then be partially deflated so that, while still gripping or grabbing the internal surface of the segmented tubular mandrel or split sleeve unit 27c, it may be withdrawn with the segmented tubular mandrel or split sleeve unit 27c, from the thus preliminarily or tack-welded metal pipes or tubings 16c–16c and the final welding operation then completed, as described hereinbefore in connection with the form of the invention illustrated in FIGS. 1 to 6, inclusive, of the drawings.

In the event of a failure of the (former) valve stem member 69, or other failure between the rigid combination air pipe or tubing and handle member 59 and the tubular expandable member or boot 40c, when the device is positioned within long metal pipes or tubings, the flexible chain member 72 provides an auxiliary means for removing the device from such long metal pipes or tubings.

Thus, it is possible in the use of the form of the invention illustrated in FIGS. 12, 13 and 14 of the drawings, to use the new apparatus 15c for concentrically and radially aligning one or more relatively long metal pipes or tubings to another metal pipe or tubing.

It will thus be seen from the foregoing description, considered in conjunction with the accompanying drawings, that the present invention overcomes the difficulties and problems hereinbefore experienced in the practice of the prior art, as discussed in the foregoing description of the background of the invention, and thus accomplishes its intended objects, as hereinbefore set forth, and has the desirable advantages and characteristics set forth herein, including those hereinbefore pointed out and others which are inherent in the invention.

We claim:

1. An apparatus for concentrically and radially aligning tubular metal components together in coaxial and radial alignment prior to welding them together, in which the said tubular metal components have internal peripheral wall surfaces providing a central internal bore in the said tubular metal components, and the said tubular metal components having outer peripheral wall surfaces and contiguous inner end wall portions each provided with an annular groove and with the said annular grooves coacting to provide an annular groove and weld area between the said contiguous inner end wall portions on the outer peripheral wall surfaces of the said tubular metal components, the said apparatus comprising:

(a) a segmented generally cylindrical tubular mandrel unit comprised of
  (1) a plurality of component radial segmental members coacting in assembled relationship to provide
    a. a radially expansible generally cylindrical segmented tubular mandrel unit adapted to be inserted into the said internal bore in the said tubular metal components and the said radial segmental members coacting in assembled relationship to provide 1. a central internal tubular passage in the said radially expansible generally cylindrical tubular segmented tubular mandrel unit;
(b) retaining means for retaining the said radial segmental members in assembled relationship;
(c) an inflatable and expandable tubular elastic member including
   (1) an inflatable expandable tubular elastic body member adapted to be inserted into the said central internal tubular passage in the generally cylindrical segemented tubular mandrel unit and past the said annular groove and weld area between the said contiguous inner end wall portions of the said tubular metal components and having
   (2) a closed inner end wall portion; and
   (3) an outer end wall portion provided with
(d) valve means for introducing a gas under pressure into the said tubular elastic body member to inflate it and expand it radially outwardly against the said radial segmental members and thereby expand the said segmented generally cylindrical tubular mandrel unit radially outwardly against the internal peripheral wall surfaces of the said tubular metal components so as to concentrically and radially align the said contiguous inner end wall portions of the said tubular metal components prior to the operation of welding them together;
(e) one of the said radial segmental members having formed therein and extending axially therein
   (1) a gas-conducting passage having
      a. a gas inlet which opens exteriorly of the said one radial segmental member at one end thereof; and the said gas-conducting passage having
   (2) a gas outlet which extends radially through the said one of the said radial segmental members onto the said outer peripheral wall surface of the said radially expansible segmental tubular mandrel unit and the said gas outlet being adapted to be positioned radially inwardly of and in communication with the said annular groove and weld area in the said tubular metal components for discharging an inert gas into the said annular groove and weld area between the said contiguous inner end wall portions of the said tubular metal components prior to and during the operation of preliminarily or tack-welding the said tubular metal components together.

2. An apparatus for aligning and retaining tubular metal components together in aligned relationship during the operation of preliminarily welding them together, in which said tubular metal components have internal peripheral wall surfaces providing a central bore in the said tubular metal components and the said tubular metal components have outer peripheral wall surfaces and contiguous end wall portions having weld areas which are to be welded together, the said apparatus comprising:
(a) a segmented tubular mandrel unit comprised of
   (1) a plurality of radial segmental members coacting in assembled relationship to provide
      a. a radially expansible segmented tubular mandrel unit adapted to be inserted into the said internal bore in the said tubular metal components and the said radial segmental members coacting in assembled relationship to provide
         1. a central internal tubular passage in the said radially expansible segmented tubular mandrel unit;
(b) retaining means for retaining the said radial segmental members in assembled relationship;
(c) an inflatable expandable tubular member including
   (1) an inflatable expandable tubular body member arranged in the said central internal tubular passage in the segmented tubular mandrel unit and adapted to extend past the said weld areas between the said contiguous end wall portions of the said tubular metal components and having
   (2) a closed inner end wall portion; and
   (3) an outer end wall portion provided with
(d) first gas-conducting means for introducing a gas into the said inflatable expandable tubular body member to inflate it and expand it radially outwardly against the said radial segmental members and thereby expand the said segmented tubular mandrel unit radially outwardly against internal peripheral wall surfaces of the said tubular metal components so as to concentrically and radially align the said contiguous end wall portions of the said tubular metal components and the said weld areas thereon prior to the operation of preliminarily welding the said tubular metal components together;
(e) means for retaining the said radial segmental members in assembled but radially expansible relationship; and
(f) the said retaining means including
   (1) a retaining ring member encircling each of the said radial segmental members in assembled but radially expansible relationship.

3. An apparatus for aligning and retaining tubular metal components together in aligned relationship during the operation of preliminarily welding them together, in which said tubular metal components have internal peripheral wall surfaces providing a central bore in the said tubular metal components and the said tubular metal components have outer peripheral wall surfaces and contiguous end wall portions having weld areas which are to be welded together, the said apparatus comprising:
(a) a segmented tubular mandrel unit comprised of
   (1) a plurality of radial segmental members coacting in assembled relationship to provide
      a. a radially expansible segmented tubular mandrel unit adapted to be inserted into the said internal bore in the said tubular metal components and the said radial segmental members coacting in assembled relationship to provide
         1. a central internal tubular passage in the said radially expansible segmented tubular mandrel unit;
(b) retaining means for retaining the said radial segmental members in assembled relationship;
(c) an inflatable expandable tubular member including
   (1) an inflatable expandable tubular body member arranged in the said central internal tubular passage in the segmented tubular mandrel unit and adapted to extend past the said weld areas between the said contiguous end wall portions of the said tubular metal components and having
   (2) a closed inner end wall portion; and
   (3) an outer end wall portion provided with (d) first gas-conducting means for introducing a first gas under pressure into the said inflatable expandable tubular body member to inflate it and expand it radially outwardly against the said radial segmental members and thereby expand the said segmented tubular mandrel unit radially outwardly against the internal peripheral wall surfaces of the said tubular metal components so as to concentrically and radially align the said contiguous end wall portions of the said tubular metal components and the said weld areas thereon prior to the operation of preliminarily welding the said tubular metal components together;

(e) second gas-conducting means for conducting a second and inert gas through the said radially expansible segmented tubular mandrel unit independently of and out of communication with the said first gas and for discharging the said second and inert gas radially outwardly from the said second gas-conducting means between the said contiguous end wall portions into the said weld areas prior to and during the operation of preliminarily welding the said end wall portions together;

(f) a first and rigid tubular means for conducting the said first gas under pressure into the said inflatable expandable tubular body member; and (g) a second and flexible tubular means connected to the said second gas-conducting means for supplying the said second and inert gas under pressure into the said second gas-conducting means.

4. An apparatus as defined in claim 3 in which (a) the said first and rigid tubular means provides handle means for inserting the said radially expansible segmented tubular mandrel unit with the said inflatable expandable tubular body member therein into and withdrawing them from the said tubular metal components.

5. An apparatus as defined in claim 4 which includes (a) a flexible chain member having one end portion attached to the said inflatable expansible tubular body member and having its other end portion attached to the said handle means and providing auxiliary means for withdrawing the said apparatus from the said tubular metal components in the event of failure of the said handle means.

6. A method of coaxially and radially aligning the two tubular metal components and welding contiguous inner end wall portions thereof together in coaxially and radially aligned relationship, which comprises the steps of:

(a) forming an annular groove on the outer peripheral wall surface of an inner end wall portion of each of the said tubular metal components;

(b) assembling the said tubular metal components into assembled relationship with the said inner end wall portions thereof and the said annular grooves in contiguous relationship to provide an annular circumferentually extending groove and weld area on the outer peripheral wall surfaces of the said inner end wall portions of the assembled tubular metal components;

(c) inserting into the interior of the said assembled tubular metal components and axially past the said annular groove and weld area therein a segmented radially expansible generally cylindrical tubular mandrel unit having therein an inflatable expandable tubular elastic member;

(d) directing a first gas under pressure into the said inflatable expandable tubular elastic member with the assembled radially expansible mandrel unit therein to expand the said segmented radially expansible generally cylindrical mandrel unit radially outwardly into engagement with the inner peripheral wall surfaces of the said tubular metal components and thereby radially expand the said tubular metal components radially outwardly into and retain them in coaxial and radial alignment;

(e) directing a second and inert gas through the body of the said segmental radially expansible generally cylindrical mandrel unit into the said annular circumferentially extending groove and weld area independently of and out of communication with the said first gas prior to and during the preliminary welding operating;

(f) partially welding the said inner end wall portions of the said two tubular metal components together as a preliminary welding operation;

(g) withdrawing the assembled radially expansible segmented mandrel unit and the sid inflatable expandable elastic tubular member from the thus partially welded tubular metal components; and (h) completing the welding of the two tubular metal components together by filling the said annular groove and weld area with weld metal.

7. A method of coaxially and radially aligning two tubular metal components and welding contiguous inner end wall portions thereof together in coaxially and radially aligned relationship, which comprises the steps of:

(a) forming an annular groove on the outer peripheral wall surface of an inner end wall portion of each of the said tubular metal components;

(b) assembling the said tubular metal components into assembled relationship with the said inner end wall portions thereof and the said annular grooves in contiguous relationship to provide an annular circumferentially extending groove and weld area on the outer peripheral wall surfaces of the said inner end wall portions of the assembled tubular metal components;

(c) inserting into the interior of the said assembled tubular metal components and axially past the said annular groove and weld area therein a segmented radially expansible generally cylindrical tubular mandrel unit having therein an inflatable expandable tubular elastic member;

(d) directing a first gas under pressure into the said inflatable expandable tubular elastic member with the assembled radially expansible mandrel unit therein to expand the said segmented radially expansible generally cylindrical mandrel unit radially outwardly into engagement with the inner peripheral wall surfaces of the said tubular metal components radially outwardly into and to retain them in coaxial and radial alignment;

(e) partially welding the said inner end wall portions of the said two tubular metal components together as a preliminary welding operation;

(f) directing a second and inert gas through the body of the said segmented radially expansible generally cylindrical mandrel unit independently of and out of communication with the said first gas into the said annular circumferentially extending groove and weld area prior to and during the preliminary welding operation;

(g) withdrawing the assembled radially expansible segmented mandrel unit and the said inflatable expandable tubular elastic member from the thus partially welded tubular metal components; and (h) completing the welding of the two tubular metal components together by filling the said annular groove and weld area with weld metal.

8. An apparatus for concentrically and radially aligning metal components together in coaxial and radial alignment prior to welding them together, in which the said tubular metal components have internal peripheral wall surfaces providing a central bore in the said tubular metal components, and the said tubular metal components having outer peripheral wall surfaces and contiguous inner end wall portions each provided with a first annular groove and with the said first annular grooves coacting to provide a weld area between the said contiguous inner end wall portions and on the outer peripheral wall surfaces of the said tubular metal components, the said apparatus comprising:

(a) a segmented generally cylindrical tubular mandrel unit comprised of
  (1) a plurality of radial segmental members coacting in assembled relationship to provide
    a. a radially expansible generally cylindrical segmented tubular mandrel unit adapted to be inserted into the said internal bore in the said tubular metal components and the said radial tubular segments coacting in assembled raltionship to provide
      1. a central internal tubular passage in the said radially expansible generally cylindrical tubular segmented tubular mandrel unit;

(b) retaining means for retaining the said radial segmental members in assembled relationship;

(c) an inflatable and expandable tubular elastic member including
  (1) in inflatable expandable tubular elastic body member adapted to be inserted into the said central internal tubular passage in the generally cylindrical segmented tubular mandrel unit and past the said weld area between the said contiguous inner end wall portions of the said tubular metal components and having
  (2) a closed inner end wall portion; and
  (3) an outer end wall portion provided with (d) valve means for introducing a gas under pressure into the said tubular elastic body member to inflate it and expand it radially outwardly against the said radial segmental members and thereby expand the said segmented generally cylindrical tubular mandrel unit radially outwardly against the internal peripheral wall surfaces of the said tubular metal components so as to concentrically and radially align the said contiguous inner end wall portions of the said tubular metal components prior to the operation of welding them together;

(e) each of the said radial segmental members including
  (1) an outer peripheral wall surface;

(f) the said retaining means including
  (1) a segmental arcuate groove formed in the said outer peripheral wall surface of each of the said radial segmental members; the said segmental arcuate grooves coacting in the assembled position of the said radial segmental members to provide
  (2) a second annular groove in the outer peripheral wall surface of the said radially expansible segmental tubular mandrel unit; and (g) the said retaining means including
  (1) a retaining ring member arranged in the said second annular groove in the said outer peripheral wall surface of the said radially expansible segmented tubular mandrel unit and retaining the said radial segmental members in assembled but radially expansible relationship.

9. An apparatus as defined in claim 8 in which
(a) each of the said radial segmental members includes
  (1) an outer peripheral wall surface; and in which
(b) the said retaining means includes
  (1) a plurality of segmental arcuate grooves formed in the said outer peripheral surface of each of the said radial segmental members, and the said segmental arcuate grooves being spaced axially along the outer peripheral wall surfaces of the said radial segmental members; and in which the said segmental arcuate grooves coacting in the assembled position of the said radial segmental members to provide
  (2) a plurality of the said second annular grooves in the outer peripheral wall surface of the said radially expansible segmental tubular mandrel unit and spaced axially therealong; and in which
(c) the said retaining means includes
  (1) a retaining ring member arranged in each of the said second annular grooves in the outer peripheral wall surface of the said radially expansible tubular mandrel unit and retaining the said radial segmental members in assembled but radially expansible relationship.

10. An apparatus for concentrically and radially aligning and welding tubular metal components together in coaxial and radial alignment prior to welding them together, in which the said tubular metal components have internal peripheral wall surfaces providing a central internal bore in the said tubular metal components, and in which the said tubular metal components have outer peripheral wall surfaces and contiguous inner end wall portions each provided with an annular groove and with the said annular grooves coacting to provide a weld area between the said contiguous inner end wall portions and on the outer peripheral wall surfaces of the said tubular metal components, the said apparatus comprising:

(a) a segmented generally cylindrical tubular mandrel unit comprised of
  (1) a plurality of radial segmental members coacting in assembled relationship to provide
    a. a radially expansible generally cylindrical segmented tubular mandrel unit adapted to be inserted into the said internal bore in the said tubular metal components and the said radial tubular segments coacting in assembled relationship to provide
      1. a central internal tubular passage in the said radially expansible generally cylindrical tubular segmented tubular mandrel unit;

(b) retaining means for retaining the said component radial segmental members in assembled relationship;

(c) an inflatable and expandable tubular elastic member including (1) an inflatable expandable tubular elastic body member adapted to be inserted into the said central internal tubular passage in the generally cylindrical segmented tubular mandrel unit and past the said weld area between the said contiguous inner end wall portions of the said tubular metal components and having (2) a closed inner end wall portion; and (3) an outer end wall portion provided with (d) valve means for introducing a gas under pressure into the said tubular elastic body member to inflate it and expand it radially outwardly against the said radial segmental members and thereby expand the said segmented generally cylindrical tubular mandrel unit radially outwardly against the internal peripheral wall surfaces of the said tubular metal components so as to concentrically and radially align the said contiguous inner end wall portions of the said tubular metal components prior to the operation of welding them together; and (e) the said segmented generally cylindrical tubular mandrel unit, the said retaining means, and the said inflatable expandable tubular elastic body member retaining the said inner end wall portions of the said tubular metal components in abutting relationship radially outwardly of the said radially expansible generally cylindrical segmented tubular mandrel unit during the welding operation.

11. An apparatus for concentrically and radially aligning and welding together a metal pipe or tubing and an annular flanged member of different internal diameters in coaxial and radial alignment prior to welding them together, in which the said metal pipe or tubing and the said annular flanged member have internal peripheral wall surfaces providing a central internal bore in the said metal pipe or tubing and in the said annular flanged member, and the said metal pipe or tubing and the said annular flange member having outer peripheral wall surfaces and contiguous inner end wall portions each provided with an annular groove and with the said annular grooves coacting to provide a weld area between the said contiguous inner end wall portions and on the external peripheral wall surfaces of the said tubular metal components, the said apparatus comprising:

(a) a segmented generally cylindrical tubular mandrel unit comprised of (1) a plurality of radial segmental members coating in assembled relationship to provide a. a radially expansible generally cylindrical segmented tubular mandrel unit adapted to be inserted into the said internal bore in the said tubular metal components and the said radial tubular segments coacting in assembled relationship to provide 1. a central internal tubular passage in the said radially expansible generally cylindrical tubular segmented tubular mandrel unit;

(b) retaining means for retaining the said radial segmental members in assembled relationship;

(c) an inflatable and expandable tubular elastic member including (1) an inflatable expandable tubular elastic body member adapted to be inserted into the said central internal tubular passage in the generally cylindrical segmented tubular mandrel unit and past the said weld area between the said contiguous inner end wall portions of the said metal pipe or tubing and the said annular flanged member and having (2) a closed inner end wall portion; and (3) an outer end wall portion provided with (d) valve means for introducing a gas under pressure into the said tubular elastic body member to inflate it and expand it radially outwardly against the said radial segmental members and thereby expand the said segmented generally cylindrical tubular mandrel unit radially outwardly against the internal peripheral wall surfaces of the said metal pipe or tubing and the said annular flanged member so as to concentrically and radially align the said contiguous inner end wall portions of the said metal pipe or tubing and the said annular flanged member prior to the operation of welding them together;

(e) a first adapter means attached to the external peripheral wall surface of the said radially expansible mandrel unit and having an external diameter larger than the external diameter of the said radially expansible mandrel unit for enabling the said radially expansible mandrel unit to be used in metal pipes or tubings having an internal diameter larger than the external diameter of the said radially expansible mandrel unit; and (f) a second adapter means attached to the external peripheral wall surface of the said radially expansible mandrel unit and having an external diameter larger than the external diameter of the said annular flanged member for enabling the said radially expansible mandrel unit to be used with annular flanged members having an internal diameter larger than the external diameter of the said radially expansible mandrel unit.

12. An apparatus for concentrically and radially aligning and welding together tubular metal components of varying internal diameters in coaxial and radial alignment prior to welding them together, in which the said tubular metal components have internal peripheral wall surfaces providing a central internal bore in the said tubular metal components, and in which the said tubular metal components have outer peripheral wall surfaces and contiguous inner end walls portions each provided with an annular groove and with the said annular grooves coacting to provide a weld area between the said contiguous inner end wall portions and on the outer peripheral wall surfaces of the said tubular metal components, the said apparatus comprising:

(a) a segmented generally cylindrical tubular mandrel unit commprised of (1) a plurality of radial segmental members coacting in assembled relationship to provide a. a radially expansible generally cylindrical segmented tubular mandrel unit adapted to be inserted into the said internal bore in the said tubular metal components and the said radial segmental members coacting in assembled relationship to provide 1. a. a central internal tubular passage in the said radially expansible generally cylindrical tubular segmented tubular mandrel unit;

(b) retaining means for retaining the said radial segmental members in assembled relationship;

(c) an inflatable and expandable tubular elastic member including (1) an inflatable expandable tubular elastic body member adapted to be inserted into the said central internal tubular passage in the generally cylindrical segmented tubular mandrel unit and past the said weld area between the said contiguous inner end wall portions of the said tubular metal components and having
    (2) a closed inner end wall portion; and
    (3) an outer end wall portion provided with
(d) valve means for introducing a gas under pressure into the said tubular elastic body member expand it radially outwardly against the said radial segmental members and thereby expand the said segmented generally cylindrical tubular mandrel unit radially outwardly against the internal peripheral wall surfaces of the said tubular metal components so as to concentrically and radially align the said contiguous inner end wall portions of the said tubular metal components prior to the operation of welding them together;
(e) the said radially expansible mandrel unit having
    (1) an external peripheral wall surface; the said apparatus including
(f) adapter means attached to the said external peripheral wall surface of the said radially expansible mandrel unit and having an external diameter larger than the external diameter of the said radially expansible mandrel unit and enabling the said radially expansible mandrel unit to be used on tubular metal components having an internal diameter larger than the external diameter of the said radially expansible mandrel unit.

13. An apparatus as defined in claim 12 which includes
(a) a plurality of said adapter means spaced axially along the said external peripheral wall surface of the said radially expansible mandrel unit.

14. An apparatus as defined in claim 12 in which
(a) the said adapter means includes
    (1) a segmental arcuate groove formed in each of the said radial segmental members; and in which
(b) the said adapter means includes
    (1) a segmental arcuate adapter member arranged in each of the said segmental arcuate grooves.

15. An apparatus as defined in claim 14 which includes
(a) means for fastening each of the said segmental arcuate adapter members in a corresponding one of the said segmental arcuate grooves.

16. An apparatus for concentrically and radially aligning tubular metal components in coaxial and radial alignment prior to welding them together, in which one of the said tubular metal components is an elongated metal pipe or tubing, and in which the said tubular metal components have internal peripheral wall surfaces providing a central internal bore in the said tubular metal components, and in which the said tubular metal components have external peripheral wall surfaces and contiguous inner end wall portions each provided with an annular groove and with the said annular grooves coacting to provide a weld area between the said contiguous inner end wall portions and on the external peripheral wall surfaces of the said tubular metal components, the said apparatus comprising:
(a) a segmented generally cylindrical tubular mandrel unit comprised of
    (1) a plurality of radial segmental members coacting in assembled relationship to provide
        a. a radially expansible generally cylindrical segmented tubular mandrel unit adapted to be inserted into the said internal bore in the said tubular metal components and the said radial tubular segments coacting in assembled relationship to provide
            1. a central internal tubular passage in the said radially expansible generally cylindrical tubular segmented tubular mandrel unit;
(b) retaining means for retaining the said radial segmental members in assembled relationship;
(c) an inflatable and expandable tubular elastic member including
    (1) an inflatable expandable tubular elastic body member adapted to be inserted into the said central internal tubular passage in the generally cylindrical segmented tubular mandrel unit and past the said weld area between the said contiguous inner end wall portions of the said tubular metal components and having
    (2) a closed inner end wall portion; and
    (3) an outer end wall portion provided with
(d) valve means for introducing a gas under pressure into the said tubular elastic body member to inflate it and expand it radially outwardly against the said radial segmental members and thereby expand the said segmented generally cylindrical tubular mandrel unit radially outwardly against the internal peripheral wall surfaces of the said tubular metal components so as to concentrically and radially align the said contiguous inner end wall portions of the said tubular metal components prior to the operation of welding them together; and
(e) handle means attached to the said inflatable expandable tubular elastic body member for inserting the said radially expansible tubular elastic body member with the said radially expansible generally cylindrical segmented tubular mandrel unit arranged thereon into and withdrawing them from the said elongated metal pipe or tubing.

17. An apparatus as defined in claim 16 in which
(a) the said inflatable expandable tubular elastic body member includes
    (1) an outer end wall having therein
        a. an air inlet; and in which said apparatus includes
(b) rigid tubular gas-conducting means for conducting a gas under pressure through the said valve means into the said inflatable expandable tubular elastic body member; and in which
(c) the said rigid tubular gas-conducting means forms the said handle means attached to the said inflatable and expandable tubular elastic body member for inserting the said inflatable and expandable tubular elastic body member with the said radially expansible generally cylindrical segmented mandrel unit arranged thereon into and for withdrawing them from the said elongated metal pipe or tubing.

18. An apparatus as defined in claim 16 in which one of the said radial segmental members has formed therein and extending axially therethrough
(a) a gas-conducting passage having
    (1) a gas inlet which opens exteriorly of the said one radial segmental member at one end thereof; and in which said gas-conducting passage has
(b) a gas outlet which extends radially through the said one of the said radial segmental members onto the said external peripheral wall surface of the said radially expansible segmental tubular mandrel unit and is adapted to be positioned radially inwardly of and in communication with the said weld area in the said tubular metal components for discharging an inert gas into the said weld area between the said contiguous inner end wall portions of the said tubular metal components prior to and during the operation of preliminarily or tack-welding the said tubular metal components together; and in which the said apparatus includes (c) a flexible elongated tubular gas-conducting member attached to the said gas inlet for conducting an inert gas into the said gas-conducting passage.

19. An apparatus as defined in claim 18 in which the said inflatable expandable tubular eslatic body member has
(a) a closed outer end wall having therein
(1) an air inlet; and in which the said apparatus includes
(b) rigid elongated tubular gas-conducting means attached to the said air inlet for conducting gas under pressure into the said inflatable and expandable tubular elastic body member independently of and out of communication with the said inert gas.

20. An apparatus for aligning and retaining tubular metal components together in aligned relationship during the operation of preliminarily welding them together, in which said tubular metal components have internal peripheral wall surfaces providing a central bore in the said tubular metal components and the said tubular metal components having external peripheral wall surfaces and contiguous end wall portions having weld areas which are to be welded together, the said apparatus comprising:
(a) a segmented tubular mandrel unit comprised of
(1) a plurality of radial segmental members coacting in assembled relationship to provide
a. a radially expansible segmented tubular mandrel unit adapted to be inserted into the said internal bore in the said tubular metal components and the said radial segmental members coacting in assembled relationship to provide
1. a central internal tubular passage in the said radially expansible segmented tubular mandrel unit;
(b) retaining means for retaining the said radial segmental members in assembled relationship;
(c) an inflatable expandable tubular member including
(1) an inflatable expandable tubular body member arranged in the said central internal tubular passage in the segmented tubular mandrel unit and adapted to extend past the said weld areas between the said contiguous end wall portions of the said tubular metal components and having
(2) a closed inner end wall portion; and
(3) an outer end wall portion provided with
(d) first gas-conducting means for conducting a first gas into the said inflatable expandable tubular elastic body member to inflate it and expand it radially outwardly against the said radial segmental members and thereby expand the said segmented tubular mandrel unit radially outwardly against the internal peripheral wall surfaces of the said tubular metal components so as to concentrically and radially align the said contiguous end wall portions of the said tubular metal components and the said weld areas thereon prior to the operation of preliminarily welding the said tubular metal components together; and (e) second gas-conducting means for conducting a second and inert gas axially of the said body of the said radially expansible segmented tubular mandrel unit independently of and out of communication with the said first gas conducted into the said inflatable expandable tubular elastic body member by the said first gas-conducting means and for discharging the said second and inert gas radially outwardly from the said radially expansible segmented mandrel unit between the said contiguous end wall portions into the said weld areas prior to and during the operation of preliminarily welding the said end wall portions together.

21. A method of coaxially and radially aligning two tubular metal components and for welding contiguous inner end wall portions thereof together in coaxially and radially aligned relationship, which comprises the steps of:
(a) forming an annular groove on the external peripheral wall surface of an inner end wall portion of each of the said tubular metal components;
(b) assembling the said tubular metal components into assembled relationship with the said inner end wall portions thereof and the said annular grooves in contiguous relationship to provide a circumferentially extending weld area on the external peripheral wall surfaces of the said inner end wall portions of the assembled tubular metal components;
(c) inserting into the interior of the said assembled tubular metal components and axially past the said weld area therein a segmented radially expansible generally cylindrical tubular mandrel unit having therein an inflatable expandable tubular elastic member;
(d) directing a first gas into the said inflatable expandable tubular elastic body member with the assembled radially expansible mandrel unit thereon to expand the said segmented radially expansible generally cylindrical mandrel unit radially outwardly into engagement with the inner peripheral wall surfaces of the said tubular metal components and thereby radially expand the sid tubular metal components radially outwardly into and retain them in coaxial and radial alignment;
(e) partially welding the said inner end wall portions of the said tubular metal components together, as a preliminary welding operation, while directing a second and inert gas into the said circumferentially extending weld area prior to and during the preliminary welding operation independently of and out of communication with the said first gas;
(f) withdrawing the assembled radial expansible segmented mandrel unit and the said inflatable expandable tubular elastic member from the thus partially welded tubular metal components; and
(g) completing the welding of the two tubular metal components together by filling the said weld area with weld metal.

22. A method of aligning tubular metal components and welding contiguous end wall portions thereof together in coaxially and radially aligned relationship, as defined in claim 21, in which the said second and inert gas is directed through the said body of the said radially expansible segmented tubular mandrel unit.

* * * * *